(12) United States Patent
Meder

(10) Patent No.: US 6,409,270 B1
(45) Date of Patent: Jun. 25, 2002

(54) AUTOMOTIVE SEAT BELT CLAMPING DEVICE

(75) Inventor: Klaus Meder, Tomioka (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,674

(22) PCT Filed: Feb. 21, 1998

(86) PCT No.: PCT/DE98/00526

§ 371 (c)(1),
(2), (4) Date: Mar. 7, 2000

(87) PCT Pub. No.: WO98/56625

PCT Pub. Date: Dec. 17, 1998

(30) Foreign Application Priority Data

Jun. 12, 1997 (DE) .................................. 197 24 876

(51) Int. Cl.⁷ .............................................. B60R 21/00
(52) U.S. Cl. ...................................... 297/464; 297/463.1
(58) Field of Search .............................. 297/216.1, 464, 297/480; 280/801.1, 806

(56) References Cited

U.S. PATENT DOCUMENTS 5,332,262 A * 7/1994 Chou
6,036,274 A * 3/2000 Kohlndorfer et al.

FOREIGN PATENT DOCUMENTS

| DE | 33 28 127 | 2/1985 |
| DE | 37 37 554 | 5/1989 |
| DE | 39 04 668 | 8/1990 |
| FR | 2 620 669 | 3/1989 |
| WO | WO 89 01430 | 2/1989 |

* cited by examiner

Primary Examiner—Milton Nelson, Jr.
(74) Attorney, Agent, or Firm—Kenyon & Kenyon

(57) ABSTRACT

To avoid a motor vehicle passenger from bending too closely towards an airbag unit disposed in front of the motor vehicle passenger during a braking maneuver before a collision, a clamping device arrests a seat belt as a function of a brake pressure.

7 Claims, 2 Drawing Sheets

AUTOMOTIVE SEAT BELT CLAMPING DEVICE

FIELD OF THE INVENTION

The present invention relates to a clamping device for a seat belt of a motor vehicle, the clamping device arresting the seat belt in response to a braking process.

BACKGROUND INFORMATION

German Published Patent Application No. 39 04 668 describes a passenger restraint system arranged in a motor vehicle. The passenger restraint system includes, in addition to airbags, seat belts, which are fitted out with a seat-belt tensioner. The seat belts together with the seat-belt tensioners assure that the vehicle passengers, in the event of accident, will be restrained in their seats, thus reducing the risk of injury.

German Published Patent Application No. 37 37 554 describes a triggering device for airbags and seat-belt tensioners, which is provided with a plurality of sensors, which react to a deformation and acceleration of the motor vehicle. In order that the decision regarding the triggering of a safety-device (airbag, seat-belt tensioner) be made as safely and reliably as possible, German Published Patent Application No. 37 37 554 provides that additional information regarding braking maneuvers be fed to the triggering processor and evaluated. This braking-maneuver information describes the kinetic behavior of the motor vehicle before and during an accident, from which the triggering processor derives control signals for the individual restraint systems in the motor vehicle.

According to the related art, the seat-belt tensioners are triggered together with the airbags. As a result of a braking maneuver that generally precedes the accident, the passengers, and this refers above all to the front-seat passenger, are tilted forward in the direction of the airbag unit. As experience has shown in the meantime, if the distance of the vehicle passengers to the airbag is too small, there is a great danger of injury once the airbag has been triggered.

PCT Publication No. 89/01430 describes a clamping device for a seat belt which is arrested in response to a heavy braking. In this context, from a cylinder an air pressure is built up which sets in motion a piston in opposition to a spring force, and due to the motion of the piston, a belt clamp outside the cylinder is locked via a lever system. However, this is a mechanically expensive arrangement.

SUMMARY OF THE INVENTION

An objective of the present invention includes providing a clamping device which has a compact design than can be realized with the least possible expense.

The present invention includes a clamping device with a cylinder in which a first piston and a second piston are movably supported. A seat belt is fed between the first position of the second piston through slots in a cylinder wall, at right angles to a cylinder axis. A force that is dependent on a brake pressure is exerted on the first piston, and a force in opposition to the brake pressure is directed at the second piston. Using the clamping device, a motor vehicle passenger is prevented, during a braking maneuver before an imminent collision, from bending in a direction of an airbag disposed in front of the motor vehicle passenger. The seat belt restrains the passenger, before the collision, in a position in which the triggering of an airbag is not dangerous for the passenger.

Thus, it is expedient that, in the event a first brake pressure threshold is exceeded, the clamping device grasps the seat belt tightly at its present extension length, and that, in the event a second brake pressure threshold that is higher than the first is exceeded, the clamping device tightens the seat belt.

The force exerted on the first piston can be exerted either by hydraulic or pneumatic means or by an electromagnetic actuator controlled by the brake pressure.

DETAILED DESCRIPTION

Figure 1A:
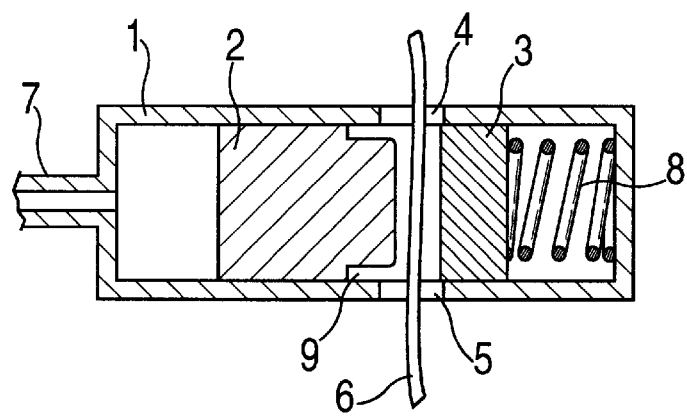
FIG. 1a illustrates first positions of two pistons in a cylinder of a clamping device according to the present invention.

A seat-belt clamping device depicted in FIGS. 1a–1d in a longitudinal cross-section includes a cylinder 1, in which two pistons 2 and 3 are movably supported in the longitudinal direction of the cylinder 1. In the cylinder wall are located two slots 4 and 5, opposite each other, through which a seat belt 6 is fed between two pistons 2 and 3. Cylinder 1 is joined to the chassis of the motor vehicle in a force-locking manner. It is advantageous if the cylinder represents one structural unit with the retractor mechanism of seat belt 6.

Piston 2 in cylinder 1 is moved in the direction of seat belt 6 by a force that is a function of the brake pressure. This force is applied by a hydraulic or pneumatic circuit that can be connected to connector branch 7, the hydraulic or pneumatic circuit being coupled with the brake circuit. The pressure operating on piston 2 is therefore proportional to the brake pressure. Second piston 3 acts as outer support for piston 2.

Piston 3 is braced by a spring 8, which acts in opposition to the brake pressure on piston 2. The energy input of piston 2 can also be exerted by an electromagnetic actuator, which is preferably an electromagnet controlled by the brake pressure or an electromotor having a linear transmission.

In FIG. 1a, piston 2 is depicted in its starting position, which it occupies if, in the event of a braking process, the brake pressure remains below the first brake pressure threshold. In this case, seat belt 6 runs freely between both pistons 2 and 3.

Figure 1B:
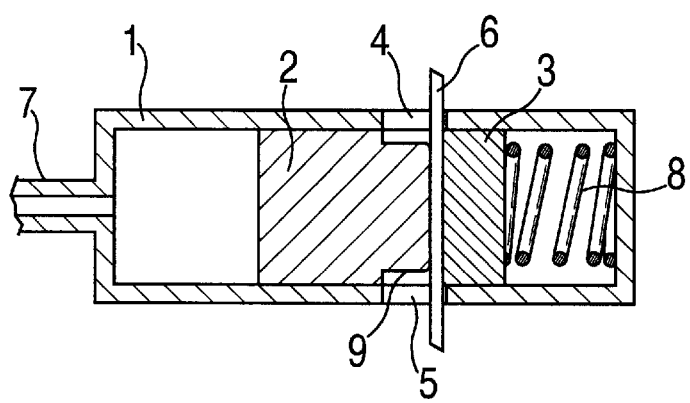
FIG. 1b illustrates second positions of the two pistons in the cylinder of the clamping device according to the present invention.
Figure 1C:
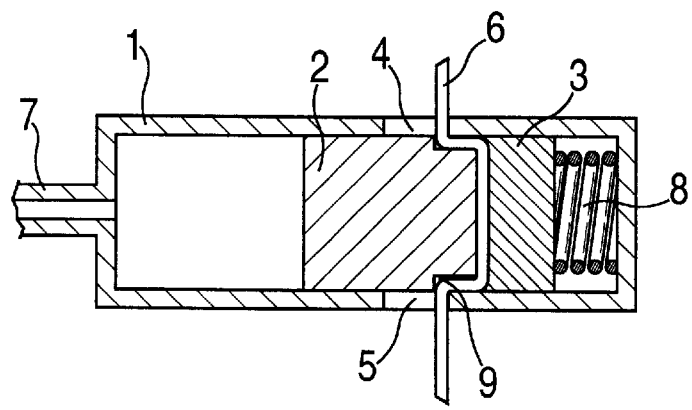
FIG. 1c illustrates third positions of the two pistons in the cylinder of the clamping device according to the present invention.

If, however, the brake pressure exceeds this first threshold, then piston 2 moves towards piston 3, as is depicted in FIG. 1b. In response to this brake pressure, piston 3, due to spring resistance 8, does not yield to the pressure exerted by piston 2, so that seat belt 6, at its present extension length, is jammed between both pistons 2 and 3.

If the brake pressure is further increased, so that it exceeds a second brake pressure threshold, then piston 3 yields to the pressure of piston 2 and a piece of seat belt 6 is pulled into the cylinder between two pistons 2 and 3. Thus, in this case, one result is a tightening of seat belt 6. Piston 2 at its belt side has a constriction so that seat belt 6, when pulled into the cylinder, can run between the cylinder wall and piston 2.

Figure 1D:
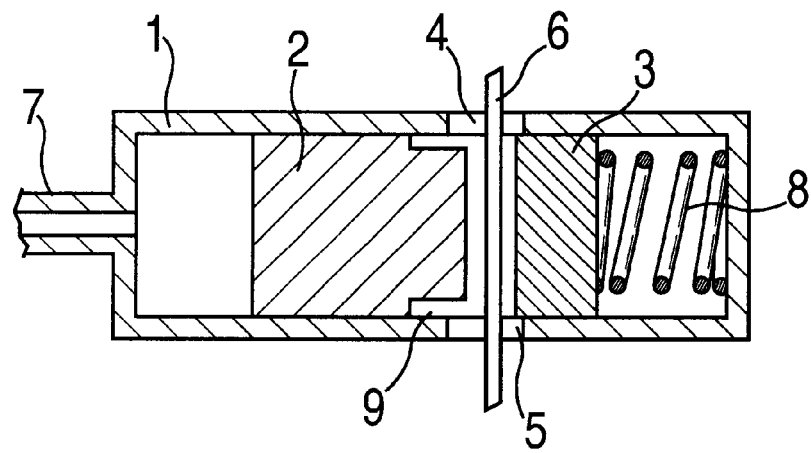
FIG. 1d illustrates fourth positions of the two positions in the cylinder of the clamping device according to the present invention.

If, as is depicted in FIG. 1*d*, the brake pressure falls below a threshold which is lower than the first brake pressure threshold, then piston 2 again takes up its starting position as depicted in FIG. 1*a*, in which seat belt 6 is no longer arrested.

Figure 2:
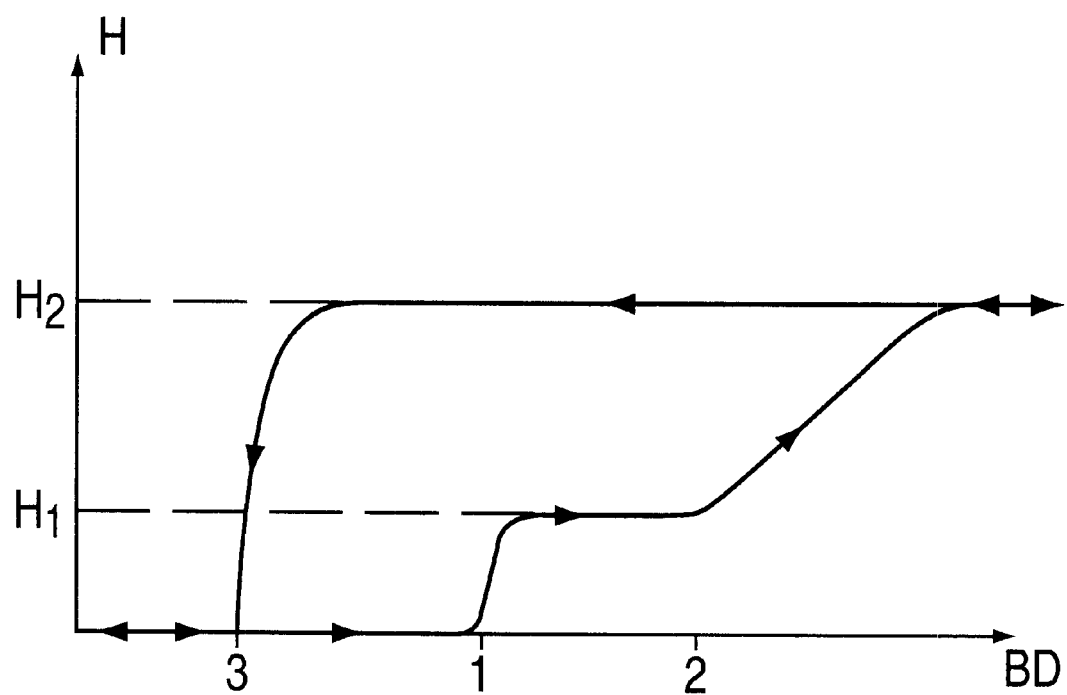
FIG. 2 shows a plot illustrating a characteristic curve of a piston stroke of the clamping device according to the present invention.

In FIG. 2, the characteristic curve of stroke H of piston 2 is depicted as a function of brake pressure BD. In this context, the result is a hysteresis-like curve. If a brake pressure threshold 1 is exceeded, piston 2 moves one stroke H1. If brake pressure BD increases, then stroke H rises from a brake pressure threshold 2 slowly to a stroke H2. If, subsequently, the brake pressure falls again, then the position of piston 2 remains at stroke H2 until brake pressure BD reaches a threshold 3, which lies below brake pressure threshold 1.

The clamping and frictional forces operating upon the rest belt can also be increased by levers and/or baffles.

What is claimed is:

1. A clamping device for use with a seat belt of a motor vehicle, the clamping device arresting the seat belt in response to a braking device, comprising:

a cylinder including a first piston and a second piston, the first piston and the second piston being movably supported along a longitudinal axis of the cylinder, the cylinder having a cylinder wall with slots, wherein the slots are positioned to accommodate the seat belt at right angles to the longitudinal axis between the first piston and the second piston, wherein a first force is exerted on the first piston, the first force being dependent upon a brake pressure, and wherein a second force is directed at the second piston, the second force being opposition to the brake pressure.

2. The clamping device according to claim 1, wherein if the brake pressure exceeds a first brake pressure threshold, then the clamping device grasps the seat belt tightly across a present extension length of the seat belt.

3. The clamping device according to claim 2, wherein if the brake pressure exceeds a second brake pressure threshold that is greater than the first brake pressure threshold, then the clamping device tightens the seat belt.

4. The clamping device according to claim 3, wherein if the brake pressure exceeds the second brake pressure threshold, then the first piston moves the second piston a distance such that the seat belt, jammed between the first piston and the second piston, is tightened.

5. The clamping device according to claim 1, wherein the first force is provided by one of a hydraulic system and a pneumatic system.

6. The clamping device according to claim 1, further comprising:

an electromagnetic actuator controlled by the brake pressure, wherein the first force is provided by the electromagnetic actuator.

7. The clamping device according to claim 6, wherein the electromagnetic actuator is one of an electromagnet and an electromotor having a linear transmission.

* * * * *